US008446715B2

(12) United States Patent
Su et al.

(10) Patent No.: US 8,446,715 B2
(45) Date of Patent: May 21, 2013

(54) PORTABLE ELECTRONIC DEVICE HAVING A POP-UP KEYBOARD CROSS-REFERENCE TO RELATED APPLICATION

(75) Inventors: Hou-Chu Su, Taipei Hsien (TW); Chih-Yi Wang, Taipei Hsien (TW); Tzu-Jai Lee, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 202 days.

(21) Appl. No.: 12/951,256

(22) Filed: Nov. 22, 2010

(65) Prior Publication Data

US 2011/0235275 A1 Sep. 29, 2011

(30) Foreign Application Priority Data

Mar. 26, 2010 (TW) .............................. 99109171 A

(51) Int. Cl.
*H05K 7/00* (2006.01)
(52) U.S. Cl.
USPC ...... 361/679.12; 361/692; 361/747; 361/807; 361/810; 361/800; 361/801; 361/802; 361/803; 361/679.11; 174/138 E; 174/138 G
(58) Field of Classification Search
USPC .......................... 361/692, 747, 800–803, 807, 810; 174/138 E, 138 G
See application file for complete search history.

(56) References Cited

U.S. PATENT DOCUMENTS

| 5,168,427 | A | * | 12/1992 | Clancy et al. ............. 361/679.12 |
| 5,566,048 | A | * | 10/1996 | Esterberg et al. ......... 361/679.27 |
| 5,694,294 | A | * | 12/1997 | Ohashi et al. ............. 361/679.48 |
| 5,764,474 | A | * | 6/1998 | Youens .................... 361/679.12 |
| 6,008,986 | A | * | 12/1999 | Mok ........................ 361/679.12 |
| 6,320,743 | B1 | * | 11/2001 | Jin et al. ................... 361/679.08 |
| 6,459,573 | B1 | * | 10/2002 | DiStefano et al. ........ 361/679.46 |
| 6,493,215 | B1 | | 12/2002 | Chiang et al. |
| 6,762,931 | B2 | * | 7/2004 | Chen ....................... 361/679.11 |
| 7,109,893 | B2 | * | 9/2006 | Chen .............................. 341/22 |
| 2002/0048155 | A1 | * | 4/2002 | Chiang et al. ............... 361/747 |
| 2005/0083645 | A1 | * | 4/2005 | Moore et al. ................. 361/683 |
| 2009/0189028 | A1 | * | 7/2009 | Depay ....................... 248/118.1 |
| 2010/0214743 | A1 | * | 8/2010 | Huang et al. ................ 361/692 |

OTHER PUBLICATIONS

Taiwanese Search Report dated Jan. 30, 2013 issued in Taiwanese Patent Application No. 099109171 and English translation, 2 pp.

* cited by examiner

*Primary Examiner* — Hung S Bui
*Assistant Examiner* — James Wu
(74) *Attorney, Agent, or Firm* — Nixon & Vanderhye P.C.

(57) ABSTRACT

A portable electronic device includes a housing formed with a first receiving space, and a second receiving space communicating spatially with the first receiving space. A keyboard is disposed within the second receiving space. A pop-up mechanism is disposed within the first receiving space, and includes a hollow post body disposed within the first receiving space, and an ejecting member disposed movably within the hollow post body and abutting against a bottom side of the keyboard. The ejecting member is movable between first and second height positions when the keyboard is pressed downwardly. When the ejecting member is in the first height position, the keyboard is in a horizontal position within the second receiving space. When the ejecting member is in the second height position, the keyboard is in a tilted position tilting outwardly from the second receiving space.

19 Claims, 12 Drawing Sheets

PORTABLE ELECTRONIC DEVICE HAVING A POP-UP KEYBOARD CROSS-REFERENCE TO RELATED APPLICATION

CROSS-REFERENCE TO RELATED APPLICATION

This application claims priority of Taiwanese Application No. 099109171, filed on Mar. 26, 2010.

BACKGROUND OF THE INVENTION

1. Field of the Invention

This invention relates to a portable electronic device, more particularly to a portable electronic device having a pop-up keyboard that is movable between a horizontal position and a tilted position.

2. Description of the Related Art

In a portable computer with a pop-up keyboard, as disclosed in Taiwanese Publication No. 300969, when an upper housing portion is rotated relative to a lower housing portion from a closed position to an open position, the keyboard can move upwardly from a stored position to an operational position. When the upper housing portion is rotated relative to the lower housing portion from the open position to the closed position, the keyboard can be restored from the operational position to the stored position. However, the keyboard in the operational position is in a horizontal state and cannot be tilted, so that the operational position of the keyboard does not conform to ergonomics. Use of the keyboard for long periods will result in fatigue of the user's hands.

In a notebook computer, as disclosed in Chinese Patent No. ZL02236112.X, when it is desired to use a keyboard module, a pull-push portion must be pushed first to disengage from a hook-engaging member of the keyboard module, after which the keyboard module is lifted upwardly. The keyboard module is then slid outwardly to an end of a slide rail, so that the hook-engaging member is engaged to a tenon. Finally, the keyboard module is rotated downwardly so that a front end thereof abuts against a tabletop, and the keyboard module is tilted. However, to shift this kind of keyboard module from a stored position to a use position, or vice versa, requires many operational steps to complete the shifting operation, so that use of the aforesaid notebook computer is very complicated and inconvenient.

SUMMARY OF THE INVENTION

A main object of the present invention is to provide a portable electronic device having a keyboard which can be easily operated to move between a horizontal position and a tilted position. The keyboard in the tilted position conforms to ergonomics so as to provide comfort to the user during use of the same.

Another object of the present invention is to provide a portable electronic device having a keyboard which is formed with a plurality of air flow guide holes to communicate fluidly a receiving space in a housing thereof with an external environment. When the keyboard is in a tilted position, the air flow guide holes can guide external air into the receiving space to enhance a heat-dissipating effect of the present invention.

The purpose of the present invention and the solution to the conventional technical problems are achieved through employment of the below technical means. According to a disclosure of the present invention, a portable electronic device comprises a housing, a keyboard, and a pop-up mechanism. The housing is formed with a first receiving space, and a second receiving space communicating spatially with the first receiving space. The keyboard is disposed within the second receiving space. The pop-up mechanism is disposed within the first receiving space, and includes a hollow post body disposed within the first receiving space, and an ejecting member disposed movably within the hollow post body and abutting against a bottom side of the keyboard. The ejecting member is movable between a first height position and a second height position when the keyboard is pressed downwardly. When the ejecting member is in the first height position, the keyboard is in a horizontal position within the second receiving space. When the ejecting member is in the second height position, the keyboard is in a tilted position tilting outwardly from the second receiving space.

Through the aforesaid technical means, the advantages and effectiveness of the portable electronic device according to the present invention reside in the fact that as a result of the configuration of the pop-up mechanism, a user only has to press the keyboard downwardly by a distance to shift the keyboard from the horizontal position to the tilted position, or vice versa. Operation of the present invention is very simple and convenient. Further, the keyboard in the tilted position conforms to ergonomics, thereby providing comfort to the user during use of the present invention. Moreover, through the presence of the air flow guide holes in the keyboard, when the keyboard is in the tilted position, the air flow guide holes can guide external air to flow into the receiving space, thereby enhancing the heat-dissipating effect of the present invention.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
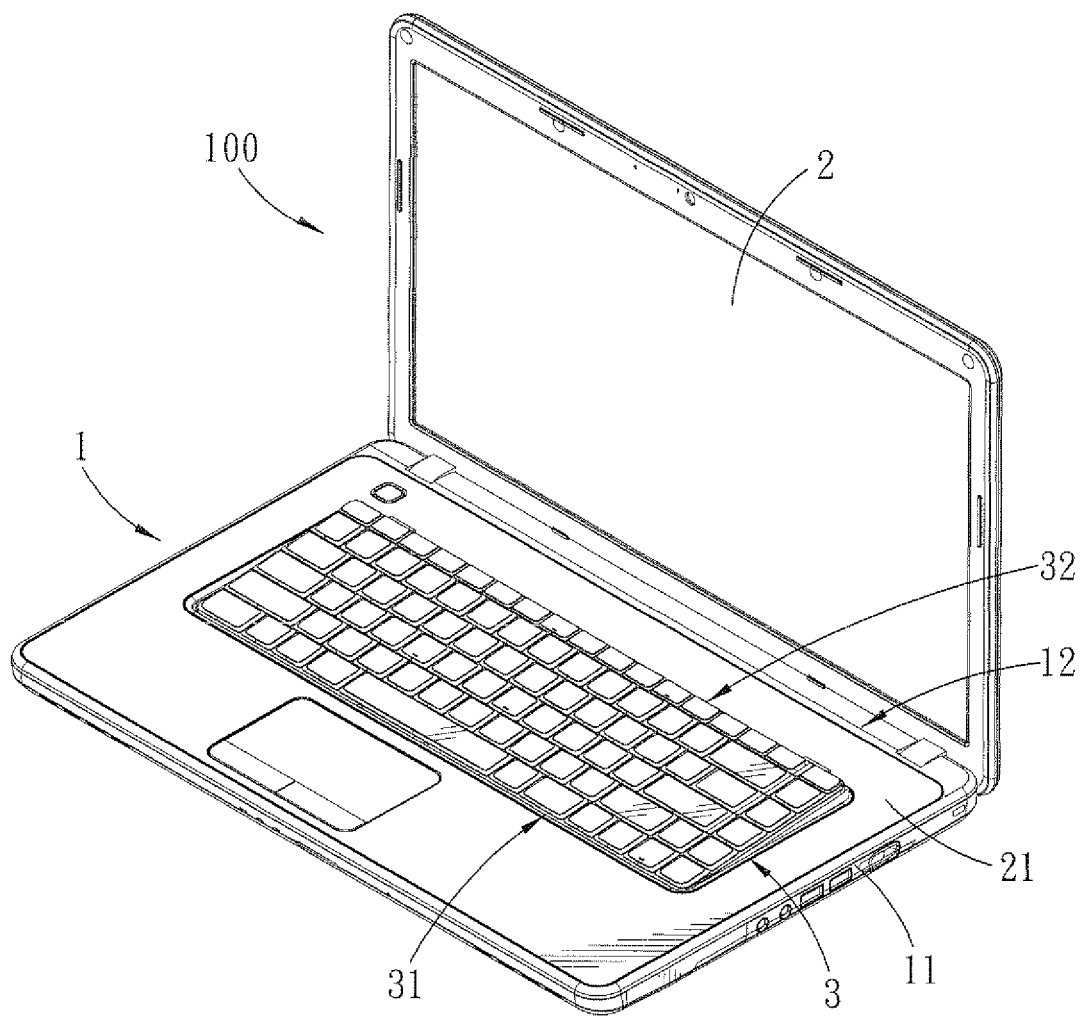
FIG. 1 is a perspective view of a portable electronic device having a pop-up keyboard according to the preferred embodiment of the present invention.

The above-mentioned and other technical contents, features, and effects of this invention will be clearly presented from the following detailed description of the preferred embodiment in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

FIGS. 1 to 16 illustrate a portable electronic device having a pop-up keyboard according to the preferred embodiment of the present invention. The portable electronic device 100 comprises a housing 1, a display screen 2 connected pivotally and rotatably to a rear end of the housing 1, a keyboard 3 disposed on the housing 1, and a pop-up mechanism 4 disposed between the housing 1 and the keyboard 3. In this embodiment, the portable electronic device 100 is exemplified as a notebook computer. Alternatively, the portable electronic device 100 may be other electronic devices, such as a flat panel computer or a personal digital assistant (PDA).

Figure 2:
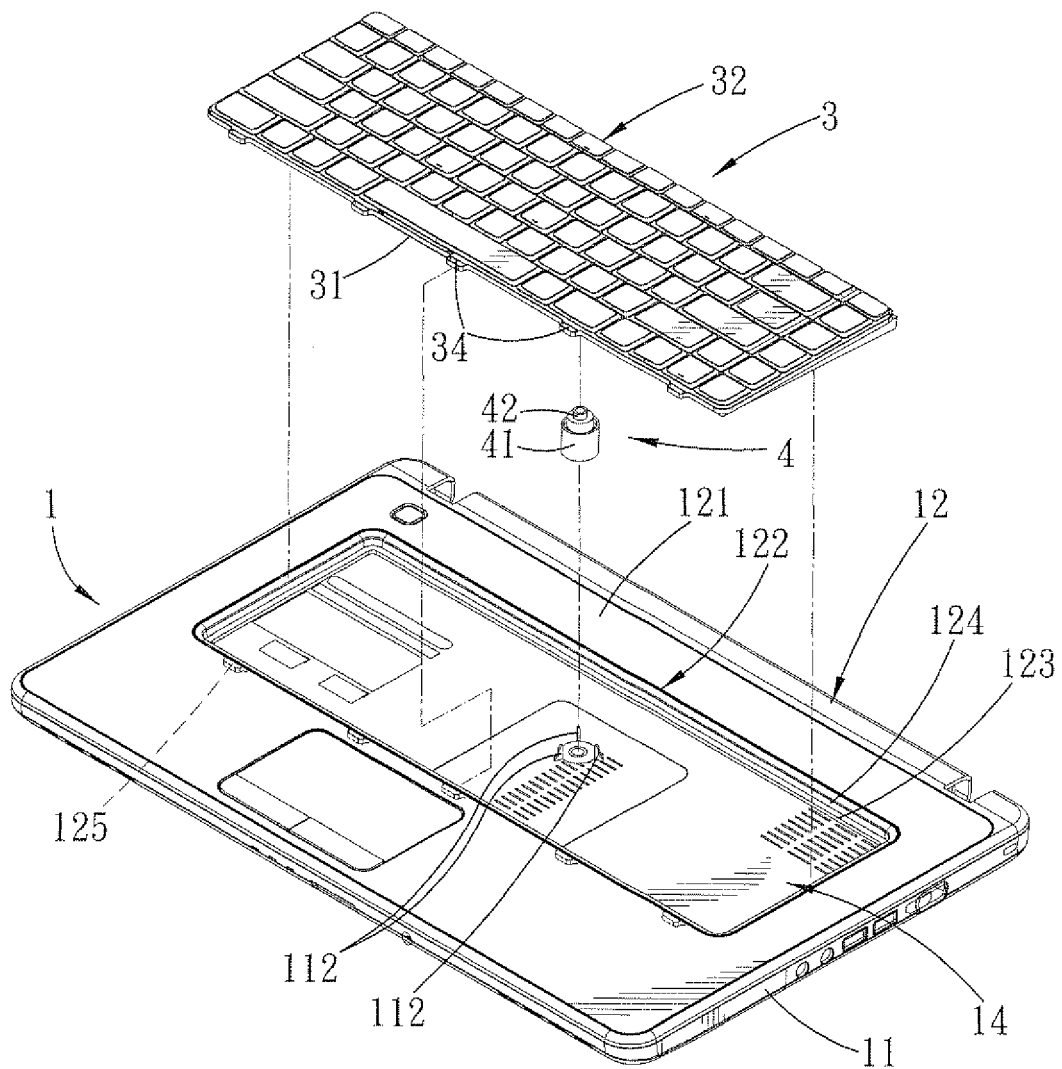
FIG. 2 is an exploded perspective view of the portable electronic device of the preferred embodiment, but without a display screen, and illustrating the assembly relationship among a housing, a keyboard, and a pop-up mechanism.
Figure 3:
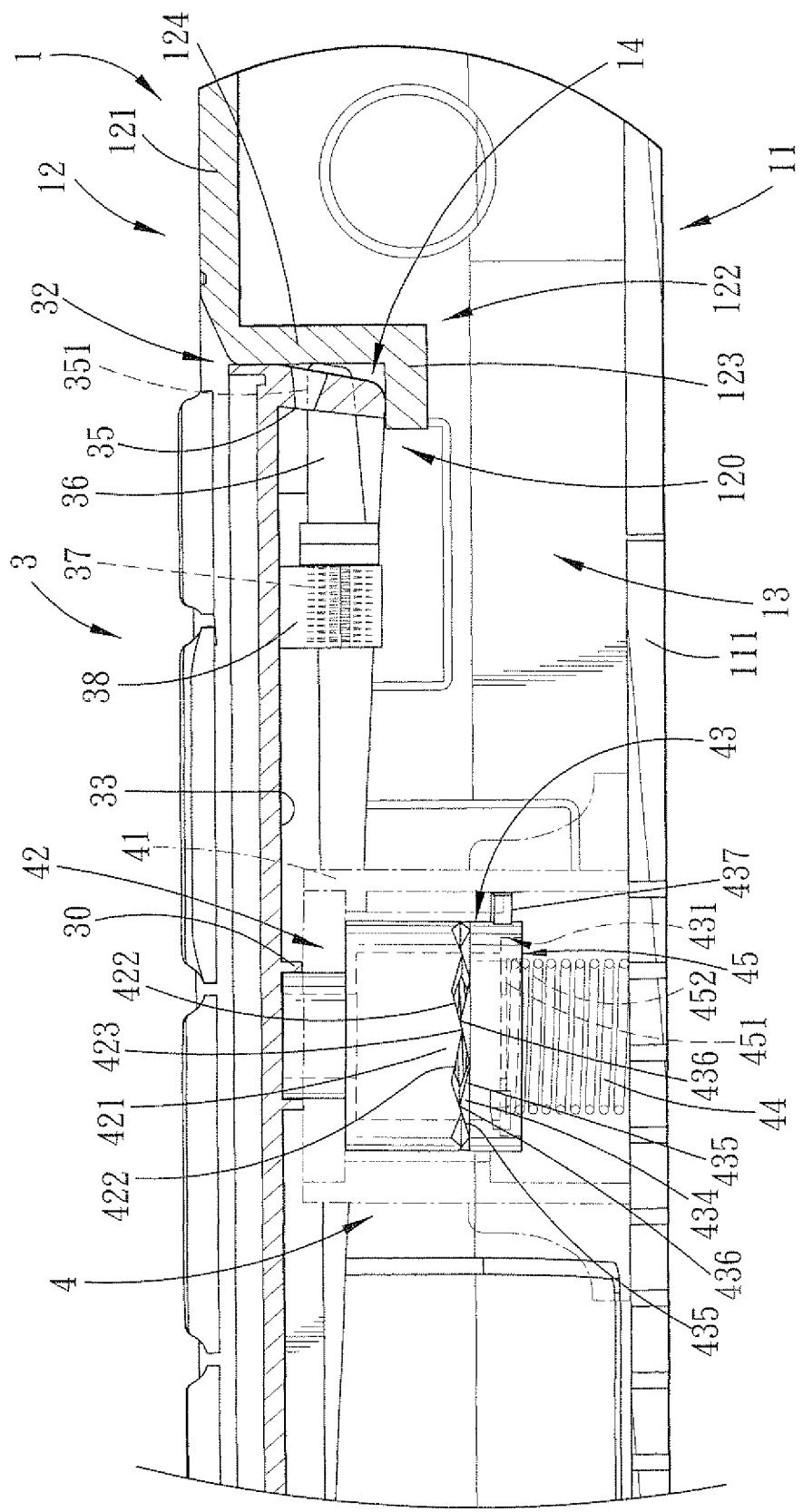
FIG. 3 is a fragmentary enlarged sectional view of the preferred embodiment, illustrating an ejecting member in a first height position and the keyboard in a horizontal position.
Figure 4:
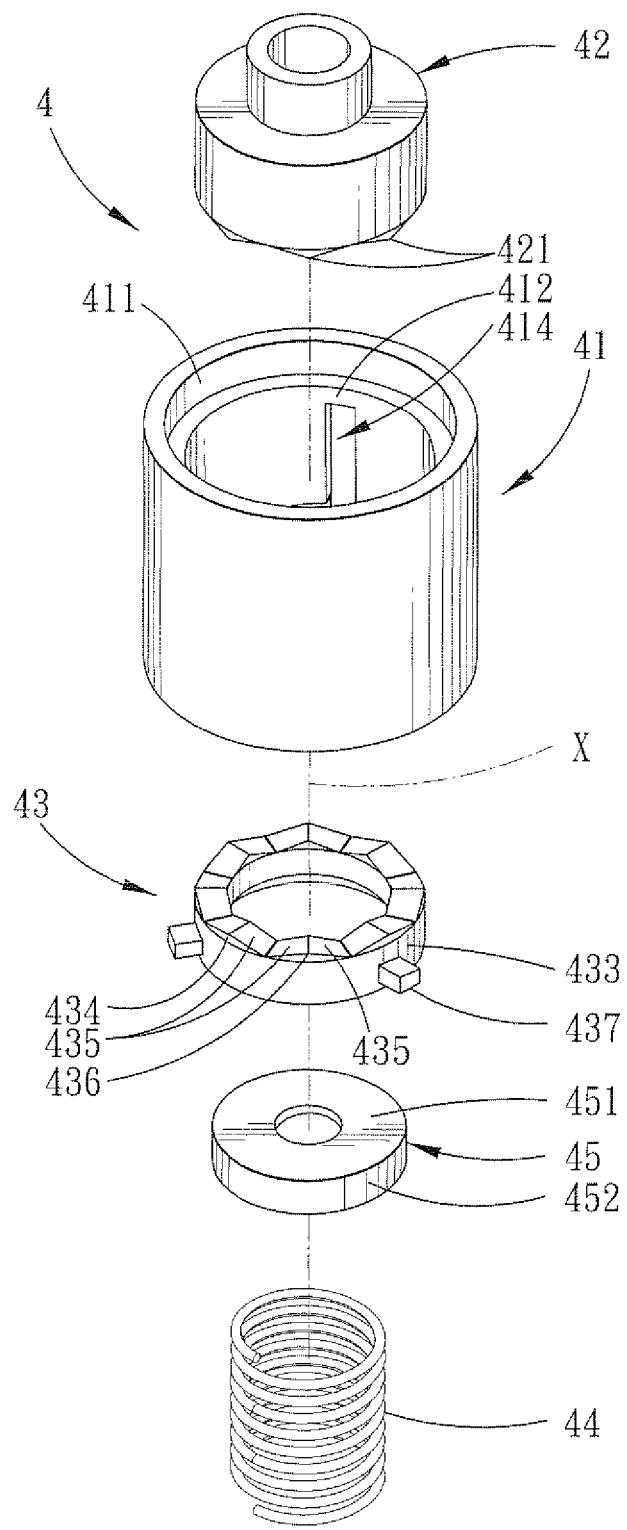
FIG. 4 is an exploded perspective view of the pop-up mechanism of the preferred embodiment.
Figure 5:
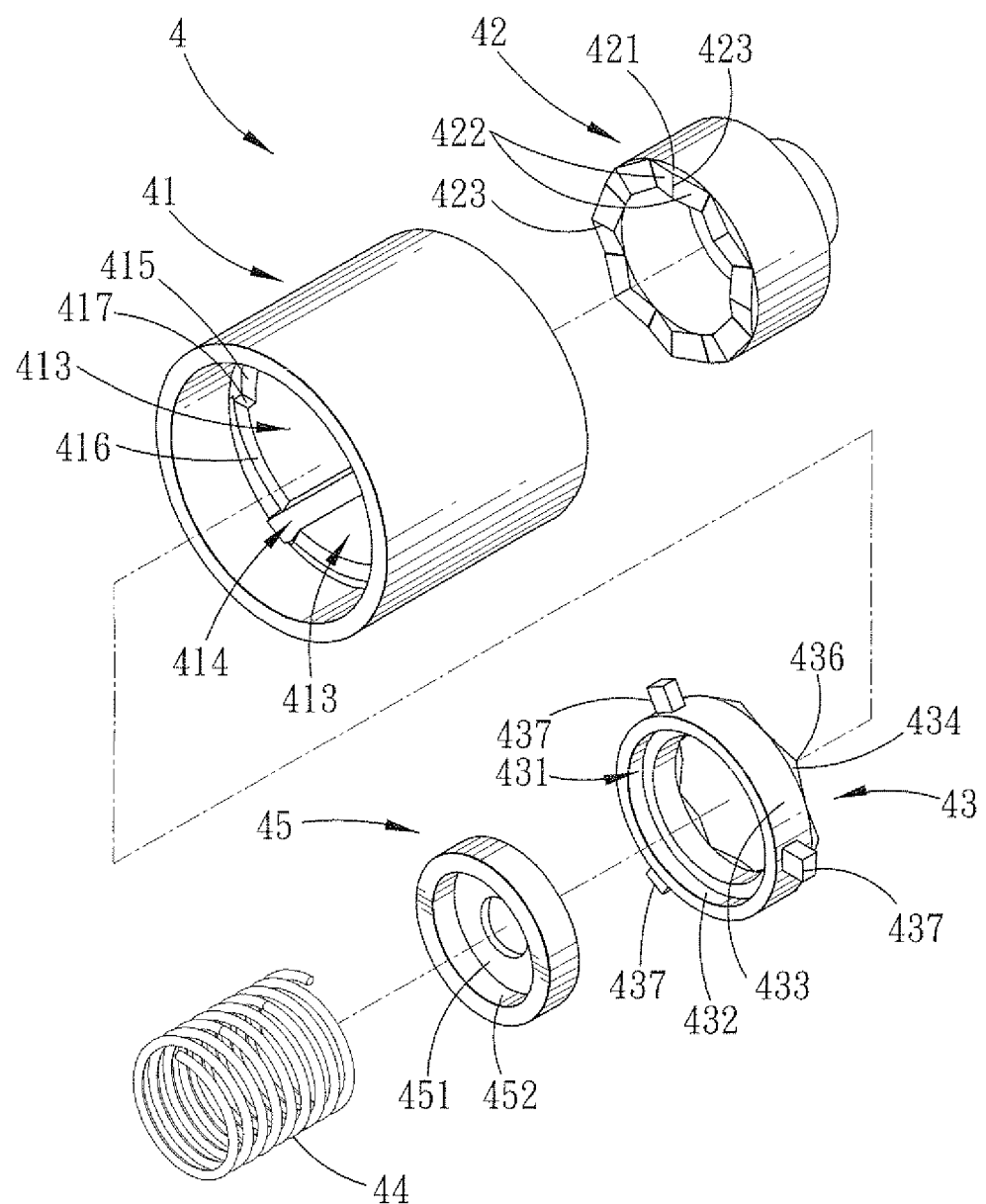
FIG. 5 is an exploded perspective view of the pop-up mechanism of the preferred embodiment taken from another viewpoint.
Figure 6:
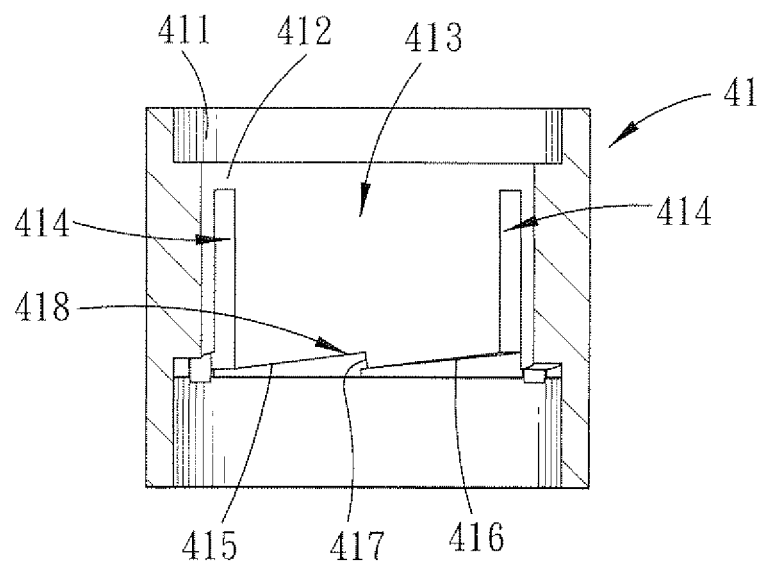
FIG. 6 is a sectional view of a hollow post body of the pop-up mechanism of the preferred embodiment.

With reference to FIGS. 2 and 3, the housing 1 includes a lower housing portion 11, and an upper housing portion 12 assembled to the lower housing portion 11. The upper housing portion 12 can be assembled fixedly to the lower housing portion 11 through a hook-engaging or screw-fastening configuration. The upper and lower housing portions 12, 11 cooperatively form a first receiving space 13 to receive therein the pop-up mechanism 4, a motherboard (not shown), a central processing unit (not shown), a heat-dissipating device (not shown), and other electronic components. The upper housing portion 12 includes a top wall 121, and a weight-bearing wall 122 extending downwardly from a central portion of the top wall 121. The weight-bearing wall 122 has a surrounding wall portion 124 extending downwardly from the top wall 121, and a loop-shaped weight-bearing wall portion 123 connected to and extending inwardly from a bottom end of the surrounding wall portion 124 and formed with a communicating hole 120. The surrounding wall portion 124 and the weight-bearing wall portion 123 cooperatively form a second receiving space 14. The first and second receiving spaces 13, 14 communicate spatially with each other via the communicating hole 120.

The keyboard 3 is disposed within the second receiving space 14, and includes a first end 31 on a front side thereof, and a second end 32 on a rear side thereof and opposite to the first end 31. The pop-up mechanism 4 is disposed within the first receiving space 13 between a bottom wall 111 of the lower housing portion 11 and a bottom face 33 of the keyboard 3. Through the pop-up mechanism 4 that provides an elastic force to spring the keyboard 3 upwardly, the keyboard 3 is movable relative to the housing 1 between a horizontal position (see FIG. 3) and a tilted position (see FIG. 12). When the keyboard 3 is in the horizontal position, the first end 31 and the second end 32 thereof are horizontal. When the keyboard 3 is in the tilted position, the second end 32 is disposed higher than the first end 31.

With reference to FIGS. 3 to 6, the pop-up mechanism 4 includes a hollow post body 41, an ejecting member 42, a rotating member 43, a biasing spring 44, and a disk body 45. The hollow post body 41 is cylindrical, and is installed on the bottom wall 111 of the lower housing portion 11. Through a plurality of equally spaced-apart positioning ribs 112 see FIG. 2) that project upwardly from the bottom wall 111 and that abut against an outer peripheral face of the hollow post body 41, the hollow post body 41 can be stably positioned on the bottom wall 111. The ejecting member 42 has a substantially cylindrical shape, and is inserted into and is movable upwardly and downwardly within the hollow post body 41. The ejecting member 42 extends through the communicating hole 120, and abuts against the bottom face 33 of the keyboard 3 in proximity to the second end 32 thereof. In this embodiment, the keyboard 3 further includes a sleeve 30 projecting from the bottom face 33 thereof and sleeved on a top end of the ejecting member 42 so as to prevent the ejecting member 42 from moving leftward and rightward relative to the keyboard 3.

The rotating member 43 is inserted into and is rotatable upwardly and downwardly within the hollow post body 41, and abuts against a bottom side of the ejecting member 42. The rotating member 43 includes a circular ring 433 having a bottom end formed with an annular groove 431. The disk body 45 is received in the annular groove 431, and includes a disk portion 451, and an annular flanged portion 452 extending downwardly from an outer periphery of the disk portion 451. The disk body 45 is sleeved on a top end of the biasing spring 44. The top end of the biasing spring 44 abuts against the disk portion 451. The flanged portion 452 abuts partially against an outer peripheral face of the biasing spring 44. Through such a connection, the disk body 45 can be sleeved fittingly on and cannot rotate relative to the biasing spring 44.

The biasing spring 44 is a compression spring having top and bottom ends abutting respectively against the disk portion 451 of the disk body 45 and the bottom wall 111 of the lower housing portion 11. The biasing spring 44 can bias the rotating member 43 to move toward the ejecting member 42 through the disk body 45, so that the ejecting member 42 is movable relative to the hollow post body 41 between a first height position (see FIG. 3) and a second height position (see FIG. 12) that is higher than the first height position.

The ejecting member 42 includes a plurality of lower protruding teeth 421 surrounding the bottom end thereof. Each protruding tooth 421 has an inverted triangular shape, and includes two interconnected first inclined surfaces 422, and an apex 423 defined by the first inclined surfaces 422. The circular ring 433 of the rotating member 43 includes a plurality of upper protruding teeth 434 surrounding a top end thereof. Each upper protruding tooth 434 has a triangular shape, and includes two interconnected second inclined surfaces 435, and an apex 436 defined by the second inclined surfaces 435. The lower protruding teeth 421 can mesh with the upper protruding teeth 434. Through such a configuration, during a downward movement of the ejecting member 42, the apex 423 of each lower protruding tooth 421 can simultaneously apply against one of the second inclined surfaces 435 of a respective upper protruding tooth 434 a downward component of force to move the rotating member 43 downwardly and a sideward component of force to rotate the rotating member 43 about a central axis (X) in a predetermined direction (D) (see FIG. 10).

The hollow post body 41 includes a cylindrical inner face 411, an annular protrusion 412 projecting radially and inwardly from the inner face 411 and proximate to a top end thereof, and a plurality of equally spaced-apart vertical ribs 413 (see FIG. 5) extending downwardly from a bottom end of the annular protrusion 412 along the length of the hollow post body 41. Each two adjacent ones of the vertical ribs 413 form therebetween a vertical slide groove 414 that opens downwardly. Each vertical rib 413 has a bottom end formed with a sawtooth structure and including a first guide slanting face 415, a second guide slanting face 416 inclining in a direction similar to that of the first guide slanting face 415, and a blocking face 417 interconnecting the first and second guide slanting faces 415, 416. The first guide slanting face 415 and the blocking face 417 cooperatively form a limiting groove 418 that opens downwardly. The rotating member 43 further includes a plurality of equally spaced-apart positioning teeth 437 projecting outwardly from an outer peripheral face of the circular ring 433. The number of the positioning teeth 437 is similar to that of the vertical slide grooves 414 and the limiting grooves 418 in the hollow post body 41. When the ejecting member 42 is in the first height position, each positioning tooth 437 is engaged to the respective limiting groove 418. At this time, the keyboard 3 is in the horizontal position. When the ejecting member 42 is in the second height position, each positioning tooth 437 is connected slidably to the respective vertical slide groove 414, and abuts against the bottom end of the annular protrusion 412 (see FIG. 13). At this time, the keyboard 3 is in the tilted position. In this embodiment, the number of each of the positioning teeth 437, the vertical slide grooves 414, and the limiting grooves 418 is exemplified as three. Alternatively, the number of each of the positioning teeth 437, the vertical slide grooves 414, and the limiting grooves 418 can be increased depending on the requirements.

With reference to FIGS. 2, 3, 7, and 8, preferably, the surrounding wall portion 124 of the weight-bearing wall 122 of the upper housing portion 12 is provided with a plurality of spaced-apart engaging grooves 125 at a front end thereof, and the keyboard 3 further includes a plurality of engaging hooks 34 provided on the first end 31 thereof and engaged to the respective engaging grooves 125. The number of the engaging hooks 34 is similar to that of the engaging grooves 125, and the position of each engaging hook 34 corresponds to that of the respective engaging groove 125. Through engagement of the engaging hooks 34 with the engaging grooves 125, the first end 31 of the keyboard 3 can be connected to the surrounding wall portion 124 of the weight-bearing wall 122. Furthermore, the keyboard 3 further includes an extension wall 35 extending downwardly from the bottom face 33 at the second end 32 thereof, two engaging elements 36, and two restoring springs 37. The extension wall 35 includes two spaced-apart through holes 351 (only one is shown in FIG. 3) extending through front and rear ends thereof. Each engaging element 36 is inserted into a respective through hole 351, and extends through the rear end of the extension wall 35 to abut against the surrounding wall portion 124. Each restoring spring 37 is a compression spring having two opposite ends abutting respectively against a protrusion 38 at the bottom face 33 of the keyboard 3 and a respective engaging element 36. Each restoring spring 37 biases the respective engaging element 36 to move toward the surrounding wall portion 124 of the weight-bearing wall 122. Hence, when the keyboard 3 is in the horizontal position, each engaging element 36 abuts against the surrounding wall portion 124. When the keyboard 3 is at the tilted position, each engaging element 36 is moved away from the surrounding wall portion 124, and through the biasing force of each restoring spring 37, each engaging element 36 can extend out of the rear end of the extension wall 35 by a distance so as to retain on the top wall 121 (see FIG. 12). Through such a connection, the keyboard 3 can be stably positioned at the horizontal and tilted positions, respectively.

Figure 9:
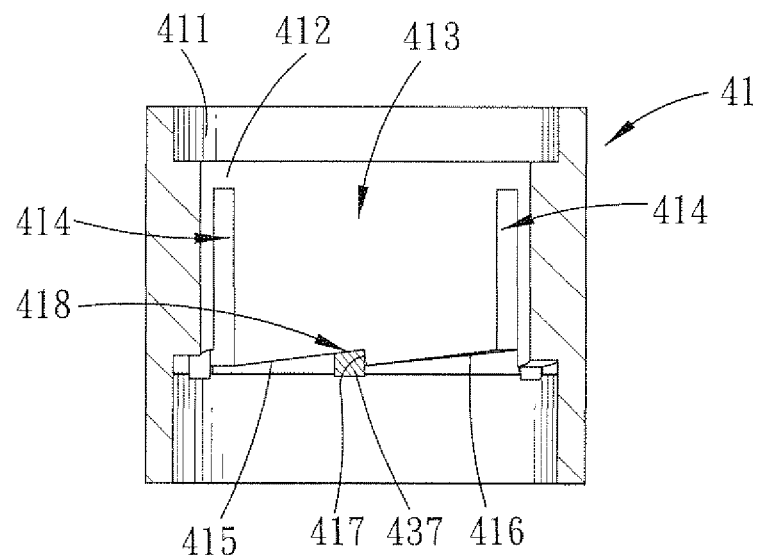
FIG. 9 is a view similar to FIG. 6, but illustrating how a positioning tooth of a rotating member of the pop-up mechanism is retained in a limiting groove of the hollow post body.

With reference to FIGS. 3 and 9, when the ejecting member 42 is in the first height position, each positioning tooth 437 of the rotating member 43 is retained within the respective limiting groove 418, and the apex 423 of each lower protruding tooth 421 of the ejecting member 42 abuts against one of the second inclined faces 435 of the respective upper protruding tooth 434 adjacent to the apex 436 thereof, and the biasing spring 44 is in a compressed state. Further, through abutment of each engaging element 36 against the surrounding wall portion 124 of the weight-bearing wall 122, the keyboard 3 can be stably positioned at the horizontal position.

Figure 10:
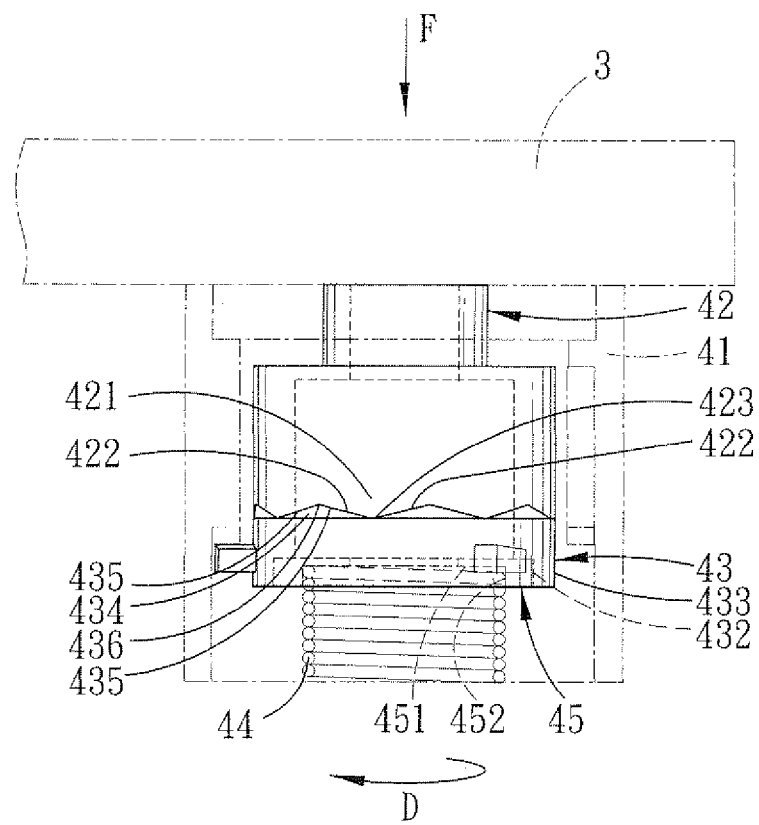
FIG. 10 illustrates how a downward movement of the keyboard brings the ejecting member and the rotating member to move downwardly therealong.
Figure 11:
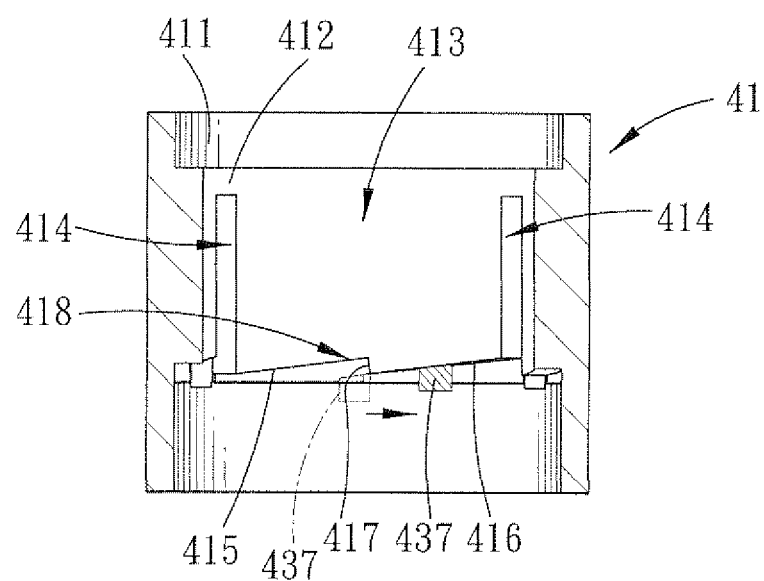
FIG. 11 illustrates the positioning tooth of the rotating member being moved to a second guide slanting face of a vertical rib of the hollow post body.

With reference to FIGS. 10 and 11, when it is desired to shift the keyboard 3 from the horizontal position to the tilted position, the keyboard 3 is pressed downwardly along the direction of an arrow (F). During downward pressing of the keyboard 3, because of friction between the sleeve 30 (see FIG. 3) of the keyboard 3 and the top end of the ejecting member 42, the ejecting member 42 cannot rotate relative to the keyboard 3, but can only move downwardly along the hollow post body 41. During downward movement of the ejecting member 42, the apex 423 of each lower protruding tooth 421 slides downwardly along and applies a downward component of force to one of the second inclined faces 435 of the respective upper protruding tooth 434 so as to push the rotating member 43 downwardly, so that each positioning tooth 437 can move away from the respective limiting groove 418, and the rotating member 43 can compress the biasing spring 44. Simultaneously, the apex 423 of each lower protruding tooth 421 applies a sideward component of force to said one of the second inclined faces 435 of the respective upper protruding tooth 434 to rotate the rotating member 43. However, as long as each positioning tooth 437 is not disengaged from the respective limiting groove 418, the rotating member 43 cannot rotate. When each positioning tooth 437 disengages from the respective limiting groove 418 and moves away from the blocking face 417, the rotating member 43 will rotate about the central axis (X) (see FIG. 4) in the predetermined direction (D) until the lower protruding teeth 421 of the ejecting member 42 mesh completely with the upper protruding teeth 434 of the rotating member 43. Rotation of the rotating member 43 is stopped at this time, and each positioning tooth 437 is moved to the second guide surface 416 of the respective vertical rib 413. It should be noted that since the disk body 45 is sleeved on the biasing spring 44, and since an inner peripheral face 432 of the circular ring 433 that defines the annular groove 431 (see FIG. 5) has a diameter larger than an outer diameter of the flanged portion 452 of the disk body 45, the rotating member 43, during its rotation, will rub against the disk portion 451 and rotate relative to the disk body 45.

Figure 12:
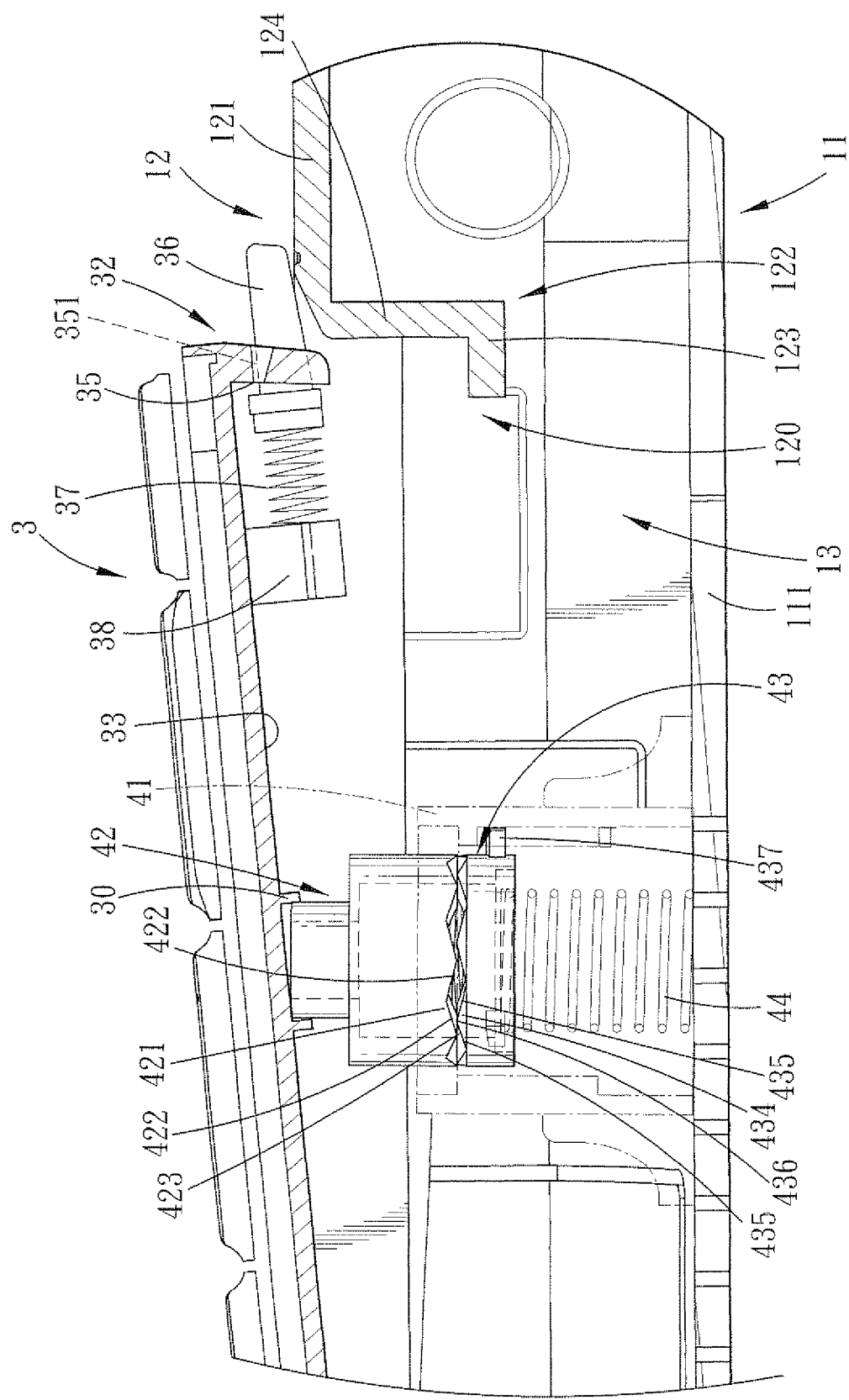
FIG. 12 is a view similar to FIG. 3, but illustrating the ejecting member in a second height position and the keyboard in a tilted position.
Figure 13:
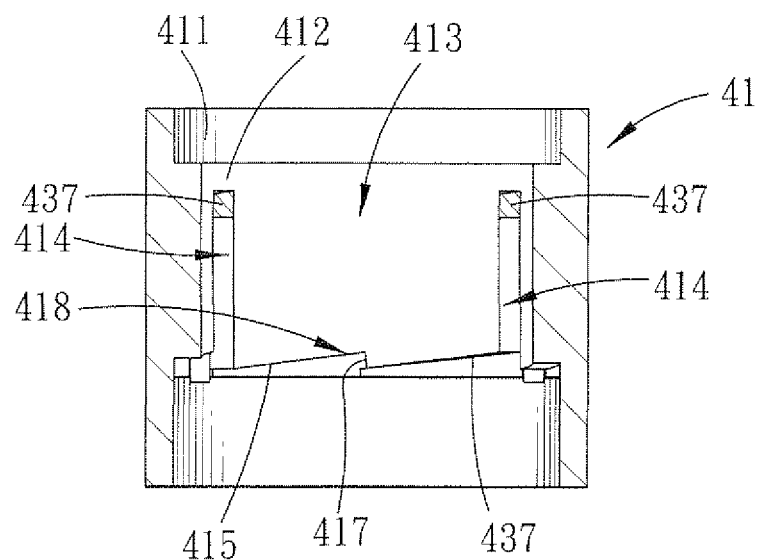
FIG. 13 illustrates the positioning teeth of the rotating member sliding respectively into vertical slide grooves in and abutting against a bottom end of an annular protrusion of the hollow post body.

With reference to FIGS. 11 to 13, afterwards, the keyboard 3 is released from being pressed, and through the restoring force of the biasing spring 44, the rotating member 43 and the ejecting member 42 are urged to push the keyboard 3 upwardly. Each positioning tooth 437 that abuts against the second guide slanting face 416 of the respective vertical rib 413 is guided by the same to rotate toward a bottom end of the respective vertical slide groove 414, and simultaneously, each upper protruding tooth 434 of the rotating member 43 will move past the apex 423 of another lower protruding tooth 421 to a bottom side thereof. When each positioning tooth 437 abuts against the respective vertical rib 413, rotation of the rotating member 43 will stop. Through the restoring force of the biasing spring 44 that overcomes the friction between the engaging element 36 and the surrounding wall portion 124 of the weight-bearing wall 122, each positioning tooth 437 can slide upwardly along the respective vertical slide groove 414, and abuts against the bottom end of the annular protrusion 412. At this time, the ejecting member 42 is moved upwardly to the second height position to push the keyboard 3 to the tilted position. During the upward movement of the keyboard 3, when each engaging element 36 is moved away from the surrounding wall portion 124, through the biasing force of each restoring spring 37 that biases the respective engaging elements 36 to extend through the rear end of the extension wall 35, each engaging element 36 can be retained on the top wall 121 of the upper housing portion 12. Through such a connection, the keyboard 3 can be supported at the tilted position. When the keyboard 2 is operated by a user, the keyboard 3 will not move upward or downward. Further, the keyboard 3 in the tilted position conforms to ergonomics, thereby providing comfort to the user during use of the present invention. Moreover, use of the keyboard 3 for a long period of time will not easily result in fatigue of the user's hands.

It should be noted that since the number of each of the upper and lower protruding teeth 421, 434 is eight, when the ejecting member 42 is moved downwardly from the first height position shown in FIG. 3 to a position shown in FIG. 10, the ejecting member 42 will rotate the rotating member 43 to an angle of 45° so as to move each positioning tooth 437 to the second guide slanting face 416 of the respective vertical rib 413. Similarly, when the ejecting member 42 moves upwardly from the position shown in FIG. 10 to the second height position shown in FIG. 12, the rotating member 43 will also rotate to an angle of 45°, so that each positioning tooth 437 will slide into the respective vertical slide groove 414.

Figure 14:
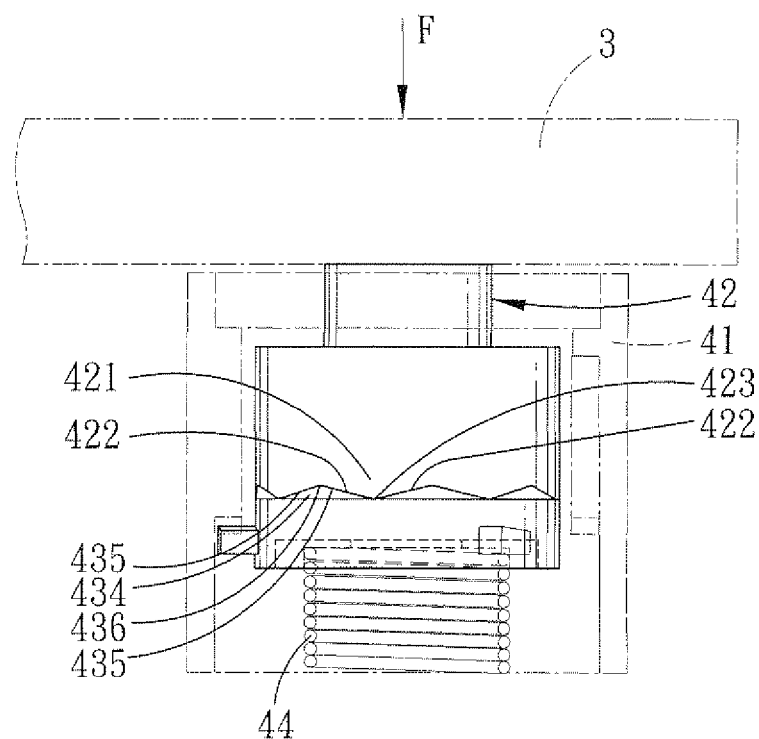
FIG. 14 illustrates how a downward movement of the keyboard brings the ejecting member and the rotating member to move downwardly therealong.
Figure 15:
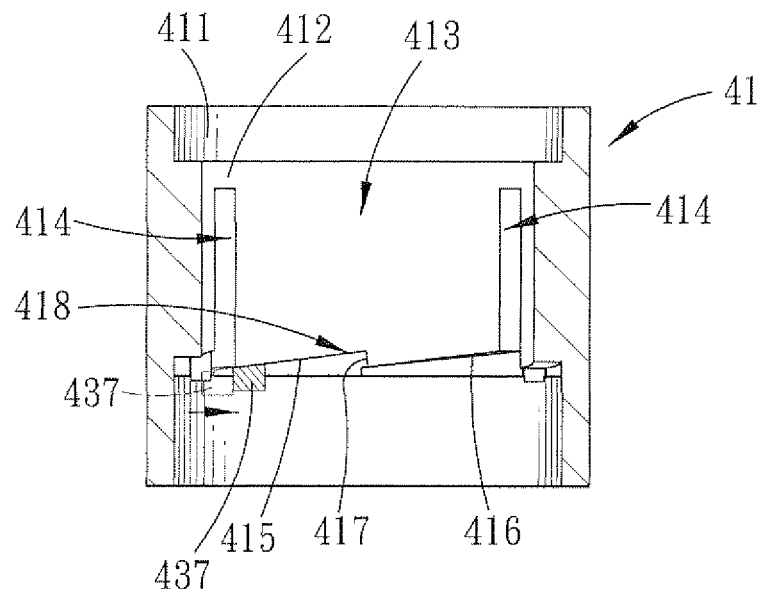
FIG. 15 illustrates how the positioning tooth of the rotating member is moved to a first guide slanting face of the vertical rib of the hollow post body.

With reference to FIGS. 12, 14, and 15, to shift the keyboard 3 from the tilted position to the horizontal position, the engaging element 36 is first pressed inwardly and forwardly to move away from the top wall 121 of the upper housing portion 12, after which the keyboard 3 is pressed downwardly along the direction of the arrow (F). Because of the downward movement of the keyboard 3, the apex 423 of each lower protruding tooth 421 will move downwardly along and apply a sideward component of force to one of the second inclined faces 435 of the respective upper protruding tooth 434 so as to move the rotating member 43 downwardly, thereby moving each positioning tooth 437 away from the respective vertical slide groove 414. The rotating member 43 will compress the biasing spring 44, and simultaneously, the apex 423 of each lower protruding tooth 421 that applies a sideward force against the second inclined face 435 of the respective upper protruding tooth 434 also urge the rotating member 43 to rotate. Each positioning tooth 437 is limited within the respective vertical slide groove 414 so that prior to movement of each positioning tooth 437 away from the respective vertical slide groove 414, the rotating member 43 cannot rotate relative to the hollow post body 41. After each positioning tooth 437 moves away from the respective vertical slide groove 414, the rotating member 43 will rotate about the axis (X) (see FIG. 4) in the predetermined direction (D) until the lower protruding teeth 421 of the ejecting member 42 and the upper protruding teeth 434 of the rotating member 43 mesh completely with each other, so that the rotating member 43 cannot rotate further. At this time, each positioning tooth 437 is moved to the first guide slanting face 415 of the respective vertical rib 413.

With reference to FIGS. 3, 9, and 15, afterwards, the keyboard 3 is released from being pressed, and through the restoring force of the biasing spring 44, the rotating member 43 and the ejecting member 42 are urged to push upwardly the keyboard 3. Since each positioning tooth 437 abuts against the respective first guide slanting face 415, each positioning tooth 437 is guided by the same to rotate and slide toward the respective limiting groove 418, and simultaneously, each upper protruding tooth 434 of the rotating member 43 will move past the apex 423 of another lower protruding tooth 421 and fall within the same. As shown in FIG. 9, when the positioning tooth 437 abuts against the blocking face 417 and engages the limiting groove 418, rotation of the rotating member 43 is stopped. At this time, the ejecting member 42 is restored to the first height position shown in FIG. 3, and the keyboard 3 is restored to the horizontal position shown in FIG. 3. It should be noted that when the ejecting member 42 moves downwardly from the second height position shown in FIG. 12 to the position shown in FIG. 14, the ejecting member 42 will rotate the rotating member 43 by 45° so as to move each positioning tooth 437 to the respective first guide slanting face 415. Similarly, when the ejecting member 42 moves from the position shown in FIG. 14 to the first height position shown in FIG. 3, the rotating member 43 will also rotate by 45° so as to slide each positioning tooth 437 into the respective limiting groove 418.

Figure 7:
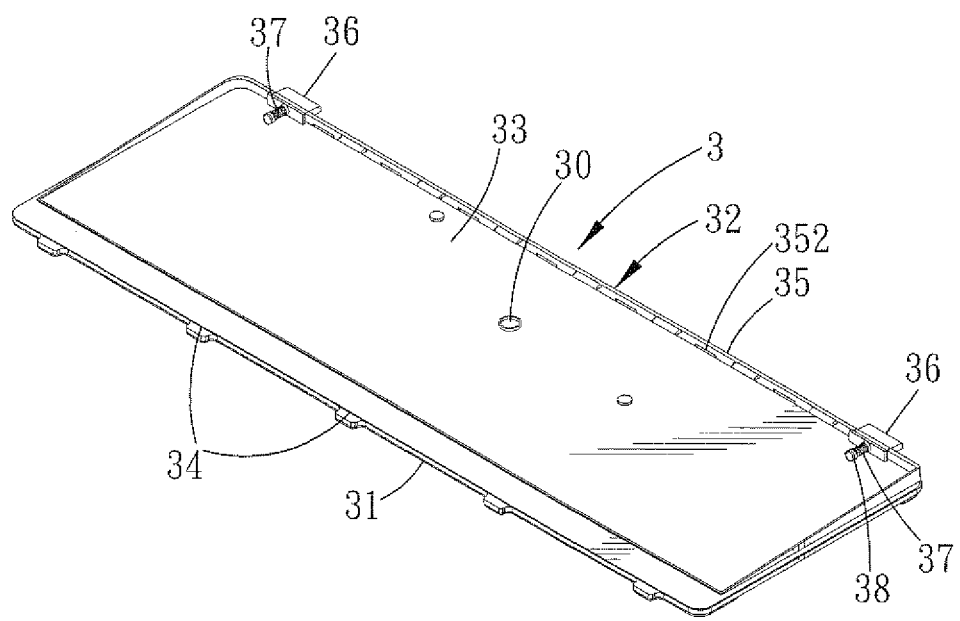
FIG. 7 is a bottom perspective view of the keyboard of the preferred embodiment.
Figure 8:
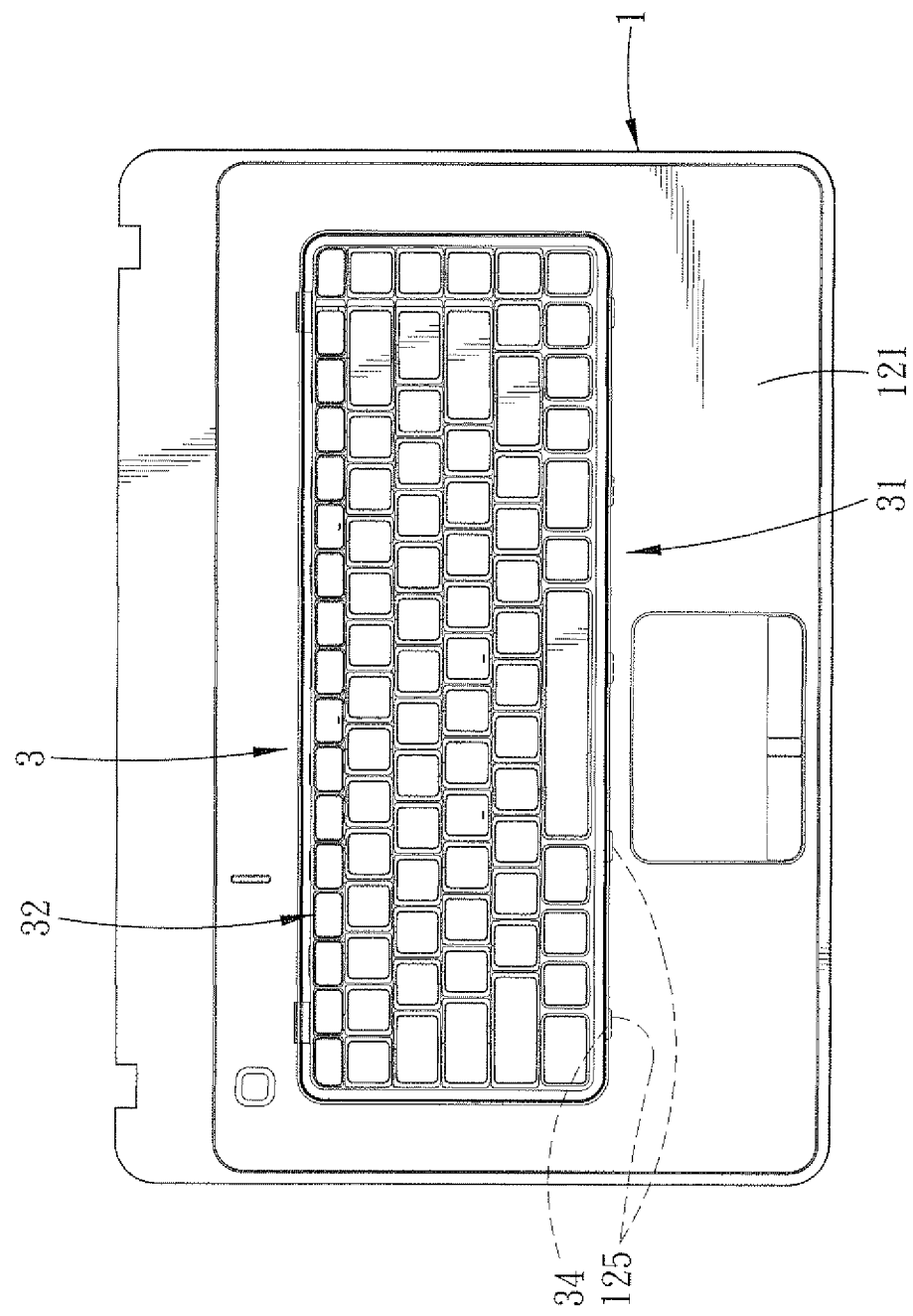
FIG. 8 is a schematic top view of the portable electronic device of the preferred embodiment, but without the display screen.
Figure 16:
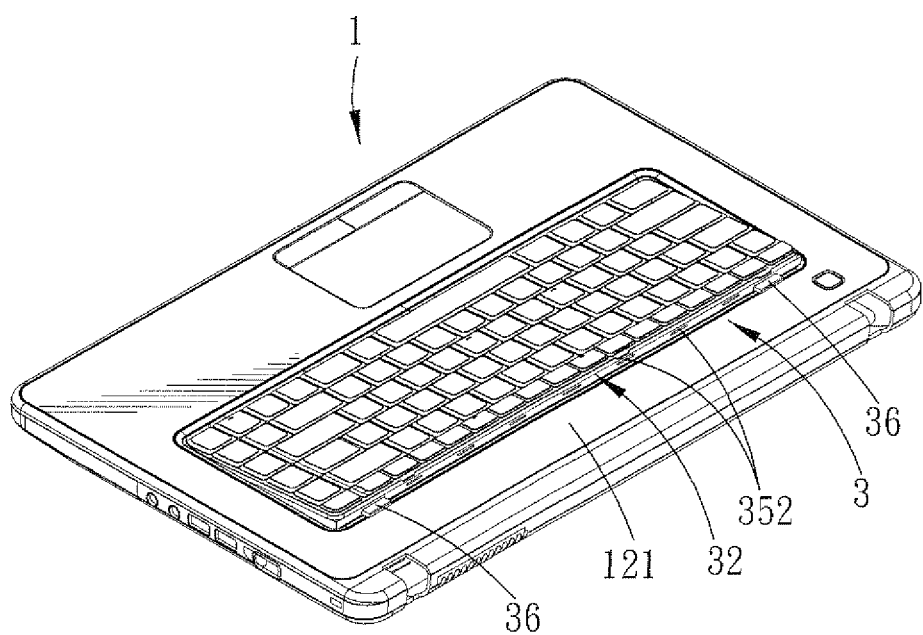
FIG. 16 is another perspective view of the portable electronic device of the preferred embodiment without the display screen, illustrating air flow guide holes in the keyboard being exposed when the keyboard is in the tilted position.

With reference to FIGS. 3, 7, and 16, the extension wall 35 of the keyboard 3 further includes a plurality of spaced-apart air flow guide holes 352 for communicating fluidly the second receiving space 14 with an external environment. When the keyboard 3 is in the tilted position, the air flow guide holes 352 are exposed on the upper housing portion 12. Since the first and second receiving spaces 13, 14 communicate fluidly with each other via the communicating hole 120, during rotation of a heat-dissipating fan (not shown) of a heat-dissipating device inside the first receiving space 13, low-temperature external air is guided to flow inside the first receiving space 13 via the air flow guide holes 352 so as to lower the temperature of the portable electronic device 100 during use thereof, thereby enhancing a heat-dissipating effect of the present invention.

From the aforesaid description, because of the configuration of the pop-up mechanism 4, users only have to press the keyboard 3 downwardly by a distance to pop-up the keyboard 3 to the tilted position, or the keyboard 3 in the tilted position is pressed downwardly by a distance to restore the keyboard 3 to the horizontal position. Hence, operation of the keyboard 3 of the present invention between the tilted and horizontal positions is very simple. Further, the keyboard 3 in the tilted position conforms to ergonomics, thereby providing comfort to the user during use of the present invention. Moreover, through the presence of the air flow guide holes 352, when the keyboard 3 is in the tilted position, external air is guided to flow into the first receiving space 13, thereby enhancing the heat-dissipating effect of the present invention. Therefore, the objects of the present invention can be realized.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A portable electronic device, comprising:
   a housing formed with a first receiving space, and a second receiving space communicating spatially with said first receiving space;
   a keyboard disposed within said second receiving space; and
   a pop-up mechanism disposed within said first receiving space and including
   a hollow post body disposed within said first receiving space; and
   an ejecting member disposed movably within said hollow post body and abutting against a bottom side of said keyboard;
   said ejecting member being movable between a first height position and a second height position;
   wherein, when said ejecting member is in said first height position, said keyboard is in a horizontal position within said second receiving space;
   wherein, when said ejecting member is in said second height position, said keyboard is in a tilted position tilting outwardly from said second receiving space;
   wherein said keyboard is independently operable to press said ejecting member so that said ejecting member is movable from said first height position to said second height position, and vice versa; and
   wherein said ejecting member is configured such that when said ejecting member in said second height position is pressed, said ejecting member is displaced from said second height position to said first height position, and when said ejecting member in said first height position is pressed, said ejecting member is displaced from said first height position to said second height position.

2. The portable electronic device of claim 1, wherein said keyboard includes a first end on a front side thereof, and a second end on a rear side thereof and opposite to said first end, said ejecting member being proximate to said second end, said second end and said first end being horizontal when said keyboard is in said horizontal position, said second end being disposed higher than said first end when said keyboard is in said tilted position.

3. The portable electronic device of claim 2, wherein said housing includes a top wall, and a weight-bearing wall extending downwardly from said top wall and formed with said second receiving space, said keyboard further including an engaging element abuttable against said weight-bearing wall, and a restoring spring biasing said engaging element to move toward said weight-bearing wall, said engaging element abutting against said weight-bearing wall when said keyboard is in said horizontal position, and abutting against said top wall when said keyboard is in said tilted position.

4. The portable electronic device of claim 3, wherein said keyboard further includes a bottom face for abutment of said ejecting member thereto, and an extension wall extending downwardly from said bottom face at said second end, said extension wall including a through hole for extension of said engaging element therethrough, and a plurality of air flow guide holes for communicating fluidly said second receiving space and an external environment.

5. The portable electronic device of claim 3, wherein said weight-bearing wall includes an engaging groove at a front end thereof, said keyboard further including an engaging hook provided on said first end and engaged to said engaging groove.

6. A portable electronic device comprising:
   a housing formed with a first receiving space, and a second receiving space communicating spatially with said first receiving space;
   a keyboard disposed within said second receiving space; and
   a pop-up mechanism disposed within said first receiving space and including
   a hollow post body disposed within said first receiving space; and
   an ejecting member disposed movably within said hollow post body and abutting against a bottom side of said keyboard;
   said ejecting member being movable between a first height position and a second height position when said keyboard is pressed downwardly;
   when said ejecting member is in said first height position, said keyboard is in a horizontal position within said second receiving space; and
   when said ejecting member is in said second height position, said keyboard is in a tilted position tilting outwardly from said second receiving space;
   wherein said pop-up mechanism further includes a rotating member disposed rotatably within said hollow post body and abutting against a bottom side of said ejecting member, and a biasing spring disposed within said hollow post body and biasing said rotating member to move toward said ejecting member, said rotating member having a central axis, when said ejecting member moves upwardly from said first height position to said second height position, said rotating member moves upwardly and rotates about said central axis in a predetermined direction, and when said ejecting member moves downwardly from said second height position to said first height position, said rotating member moves downwardly and rotates about said central axis in said predetermined direction.

7. The portable electronic device of claim 6, wherein said keyboard includes a bottom face for abutment of said ejecting member thereto, and a sleeve projecting from said bottom face and sleeved on said ejecting member.

8. The portable electronic device of claim 7, wherein said pop-up mechanism further includes a disk body sleeved on a top end of said biasing spring, said rotating member being sleeved on said disk body.

9. The portable electronic device of claim 8, wherein said hollow post body includes a cylindrical inner face, an annular protrusion projecting inwardly and radially from said inner face, and a plurality of spaced-apart vertical ribs extending downwardly from said annular protrusion along the length of said hollow post body, each two adjacent ones of said vertical ribs forming therebetween a vertical slide groove, each of said vertical ribs having a bottom end formed with a limiting groove, said rotating member including a circular ring, and a plurality of equally spaced-apart positioning teeth projecting outwardly from an outer peripheral face of said circular ring, each of said positioning teeth engaging a respective one of said limiting grooves in said vertical ribs when said ejecting member is in said first height position, and being connected slidably to a respective one of said vertical slide grooves in said hollow post body and abutting against said annular protrusion when said ejecting member is in said second height position.

10. The portable electronic device of claim 9, wherein said ejecting member has a substantially cylindrical shape, and includes a plurality of lower protruding teeth surrounding a bottom end thereof, each of said lower protruding teeth having an inverted triangular shape, and including two first inclined faces, and an apex defined by said first inclined faces, said circular ring including a plurality of upper protruding teeth surrounding an upper end thereof, each of said upper protruding teeth having a triangular shape, and including two second inclined faces, said apex of each of said lower protruding teeth abutting against one of said second inclined faces of a respective one of said upper protruding teeth, so that when said ejecting member is pressed downwardly by said keyboard, said apex of each of said lower protruding teeth will slide along said one of said second inclined faces of the respective said upper protruding tooth to urge said rotating member to move downwardly and rotate about said central axis in said predetermined direction.

11. The portable electronic device of claim 10, wherein said bottom end of each of said vertical ribs includes a first guide slanting face, a second guide slanting face, and a blocking face interconnecting said first and second guide slanting faces, said first and second guide slanting faces being used to guide each of said positioning teeth to slide therealong, said first guide slanting face and said blocking face cooperatively forming said limiting groove.

12. The portable electronic device of claim 1, wherein said keyboard includes a bottom face for abutment of said ejecting member thereto, and an extension wall extending downwardly from said bottom face, said extension wall including a plurality of air flow guide holes, each of said air flow guide holes permitting fluid communication between said second receiving space and an external environment.

13. The portable electronic device of claim 1, wherein said keyboard includes an engaging element abuttable against said housing, and a restoring spring biasing said engaging element to move toward said housing, said engaging element abutting against said housing when said keyboard is in said horizontal position, and abutting against a top end of said housing when said keyboard is in said tilted position.

14. The portable electronic device of claim 7, wherein said keyboard includes a first end on a front side thereof, and a second end on a rear side thereof and opposite to said first end, said ejecting member being proximate to said second end, said second end and said first end being horizontal when said keyboard is in said horizontal position, said second end being disposed higher than said first end when said keyboard is in said tilted position.

15. The portable electronic device of claim 14, wherein said housing includes a top wall, and a weight-bearing wall extending downwardly from said top wall and formed with said second receiving space, said keyboard further including an engaging element abuttable against said weight-bearing wall, and a restoring spring biasing said engaging element to move toward said weight-bearing wall, said engaging element abutting against said weight-bearing wall when said keyboard is in said horizontal position, and abutting against said top wall when said keyboard is in said tilted position.

16. The portable electronic device of claim 15, wherein said keyboard further includes an extension wall extending downwardly from said bottom face at said second end, said extension wall including a through hole for extension of said engaging element therethrough, and a plurality of air flow guide holes for communicating fluidly said second receiving space and an external environment.

17. The portable electronic device of claim 15, wherein said weight-bearing wall includes an engaging groove at a front end thereof, said keyboard further including an engaging hook provided on said first end and engaged to said engaging groove.

18. The portable electronic device of claim 1, wherein said keyboard further includes a bottom face for abutment of said ejecting member thereto, and a sleeve projecting from said bottom face and sleeved on said ejecting member.

19. The portable electronic device of claim 18, wherein said pop-up mechanism further includes a rotating member disposed rotatably within said hollow post body and abutting against a bottom side of said ejecting member, a biasing spring disposed within said hollow post body and biasing said rotating member to move toward said ejecting member, and a disk body sleeved on a top end of said biasing spring, said rotating member being sleeved on said disk body.

* * * * *